United States Patent [19]

Wada

[11] Patent Number: 4,888,647

[45] Date of Patent: Dec. 19, 1989

[54] IMAGE RECORDING APPARATUS WITH IMPROVED SOS DETECTION

[75] Inventor: Kanji Wada, Osaka, Japan

[73] Assignee: Minolta Camera Kabushiki Kaisha, Osaka, Japan

[21] Appl. No.: 323,276

[22] Filed: Mar. 14, 1989

Related U.S. Application Data

[63] Continuation-in-part of Ser. No. 286,453, Dec. 19, 1988.

[30] Foreign Application Priority Data

Dec. 21, 1987 [JP] Japan ................................. 62-324808
Dec. 21, 1987 [JP] Japan ................................. 62-324809

[51] Int. Cl.$^4$ .............................................. H04N 1/40
[52] U.S. Cl. .................................... 358/474; 358/206; 358/443
[58] Field of Search ............... 358/285, 293, 206, 280, 358/256

[56] References Cited

U.S. PATENT DOCUMENTS

| | | | |
|---|---|---|---|
| 4,222,643 | 9/1980 | Kitamura et al. | 354/7 |
| 4,268,867 | 5/1981 | Traino | 358/285 |
| 4,320,420 | 3/1982 | Rider | 358/285 |
| 4,400,740 | 8/1983 | Traino et al. | 358/293 |
| 4,692,877 | 9/1987 | Byerly et al. | 353/285 |
| 4,728,989 | 3/1988 | Ohmori | 346/46 L |

Primary Examiner—Edward L. Coles, Sr.
Attorney, Agent, or Firm—Price, Gess & Ubell

[57] ABSTRACT

An image recording apparatus comprises a laser light source for generating a primary beam for scanning and a secondary beam for monitoring the light amount thereof which has a photodiode for detecting the light amount of the secondary beam. The output signal of the photodiode obtained when only the secondary beam is incident on the photodiode is distinguished from the output signal of the photodiode obtained when the secondary beam and the primary beam having been reflected from a deflecting surface are incident at the same time on the photodiode in order to output a start of scan signal for every one scan line at a moment when the primary beam and the secondary beam are incident at the same time on the photodiode.

13 Claims, 6 Drawing Sheets

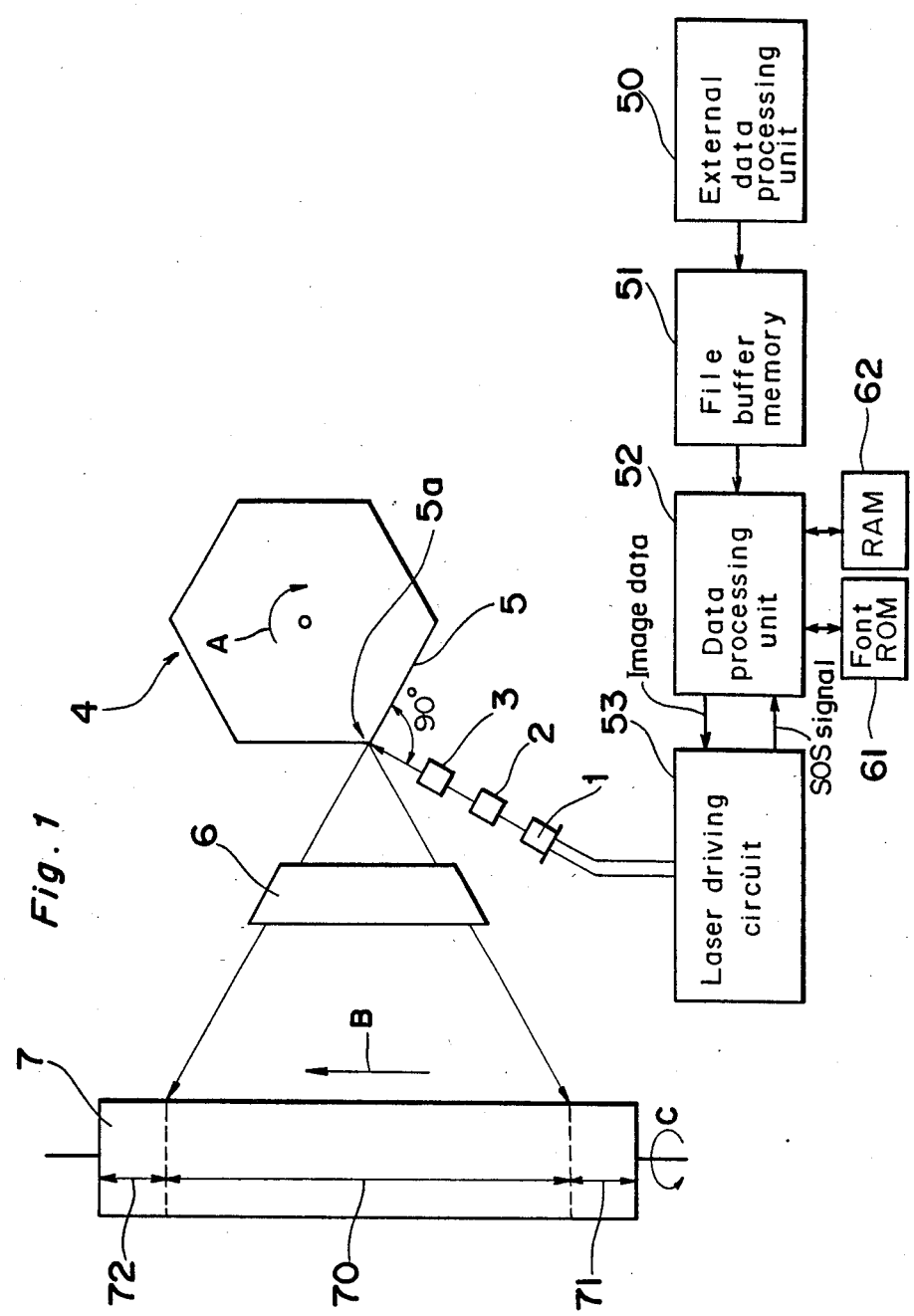

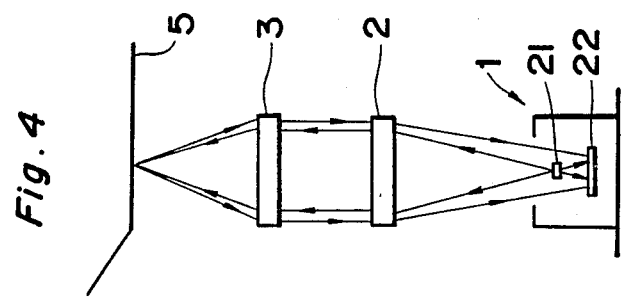
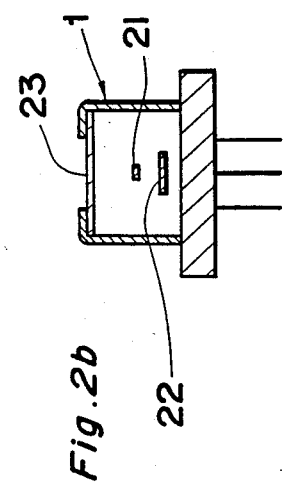
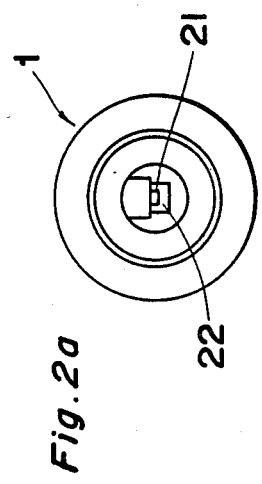

4,888,647

IMAGE RECORDING APPARATUS WITH IMPROVED SOS DETECTION

This is a continuation-in-part application of the U.S. application Ser. No. 286,453 filed Dec. 19, 1988.

BACKGROUND OF THE INVENTION

1. Field of the Invention

The present invention relates to an image recording apparatus such as a laser printer, and particularly to an improved apparatus for detecting a start of scan (SOS) signal to true up starting positions of respective line images.

2. Description of the Related Art

In a conventional laser printer, a laser beam outputted from a semiconductor laser which is driven according to image data is deflected by a deflecting surface of a polygon mirror rotated by a motor and the deflected laser beam is projected on a photoconductor drum so that the image data is recorded on the photoconductor drum in the unit of one scan line.

In a conventional laser printer, a photodiode for detecting the SOS signal is arranged at a predetermined position which is chosen so as not to interface with the laser beam during each scan for writing the line data on a photoconductor means such as a photoconductor drum. When the laser beam deflected by the deflection means passes the photodiode, an SOS signal is outputted to start the writing of each data.

In another conventional laser printer, there is provided an optical fiber, one end of which is positioned at the predetermined position for the photodiode in the above mentioned laser printer, and a photodiode which is connected to the other end of the optical fiber in order to detect the laser beam therethrough. On the other hand, one more photodiode is provided for monitoring the light amount of the laser beam emitted from the semiconductor laser which varies according to the temperature thereof.

Accordingly, in the conventional laser printer, there is generally provided at least two photodiodes, one for detecting the SOS signal and the other for monitoring the light amount of the laser beam.

SUMMARY OF THE INVENTION

An object of the present invention is to provide an improved image recording apparatus which is able to detect the SOS signal and the monitoring signal.

Another object of the present invention is to provide an image recording apparatus which is able not only to detect the SOS signal but also to monitor the light amount of the laser beam emitted from the semiconductor laser with use of a photodiode.

According to one aspect of the present invention, there is provided an image recording apparatus comprising: a laser light source for generating a primary beam for scanning and a secondary beam for monitoring the light amount thereof which has a light detecting means therein, said light detecting means detecting said light amount of the secondary beam usually; a photoconductor means for forming a latent image thereon; a deflecting means having at least one deflecting surface for deflecting said primary beam from said laser light source to scan it on said photoconductor means, said deflecting means and said laser light source being arranged in such a manner that said primary beam is reflected by said deflecting means toward said laser light source at a moment before starting the scan; and a distinguishing means for distinguishing the output signal of said light detecting means obtained when only the secondary beam is incident on said light detecting means from the output signal of said light detecting means obtained when the secondary beam and the primary beam having been reflected from said deflecting means are incident at the same time on said light detecting means in order to output a start of scan signal for each scan line at a moment when the primary beam and the secondary beam are incident at the same time on said light detecting means.

According to another aspect of the present invention, there is provided an image recording apparatus comprising: a laser light source for generating a primary beam for scanning and a secondary beam for monitoring the light amount thereof which has a light detecting means therein, said light detecting means detecting said light amount of the secondary beam- usually; a photoconductor means for forming a latent image thereon; a deflecting means having at least one deflecting surface for deflecting said primary beam from said laser light source to scan it on said photoconductor means, said deflecting means and said laser light source being arranged in such a manner that said primary beam is reflected by said deflecting means toward said laser light source at a moment before starting the scan; a distinguishing means for distinguishing the output signal of said light detecting means obtained when only the secondary beam is incident on said light detecting means from the output signal of said light detecting means obtained when the secondary beam and the primary beam having been reflected from said deflecting means are incident at the same time on said light detecting means in order to output a start of scan signal for each scan line at the moment when the primary beam and the secondary beam are incident at the same time on said light detecting means; a sample and hold means for sampling and holding the output signal outputted from said light detecting means; a current supply means for supplying a driving current to said laser light source so as to keep a constant light output according to the output signal outputted from said sample holding means; and a control means for making said current supply means supply the driving current at least for a first period required for detecting the start of scan signal and making said sample and hold means hold the sampling value of the first period at least for the first period and a second period when the image is formed on said photoconductor means.

Accordingly, the construction of the optical system of the laser device becomes very simple, because the SOS signal can be generated in accordance with the output signal of said light detecting means for detecting the light amount of the laser beam outputted from said laser light source, resulting in that the cost of manufacturing the image recording apparatus can be reduced.

The detection of the SOS signal and the control for keeping a constant light output of said laser light source are performed in accordance with the output signal of said light detecting means, resulting in that the control for keeping a constant light output of said laser light source can be performed without affecting the detection of the SOS signal.

BRIEF DESCRIPTION OF THE DRAWINGS

These and other objects and features of the present invention will become more apparent when the preferred embodiment of the present invention is described in detail with reference of accompanied drawings in that;

FIG. 1 is a schematic diagram of a laser printer according to a preferred embodiment of the present invention;

FIG. 2a is a plan view of a semiconductor laser shown in FIG. 1;

FIG. 2b is a cross sectional view of the semiconductor laser shown in FIG. 1;

FIG. 4 is a schematic diagram showing a principal structure of an optical system comprising the semiconductor laser, a collimator lens, a cylindrical lens, and a polygon mirror shown in FIG. 1;

DETAILED DESCRIPTION OF THE PREFERRED EMBODIMENT

Figure 7:
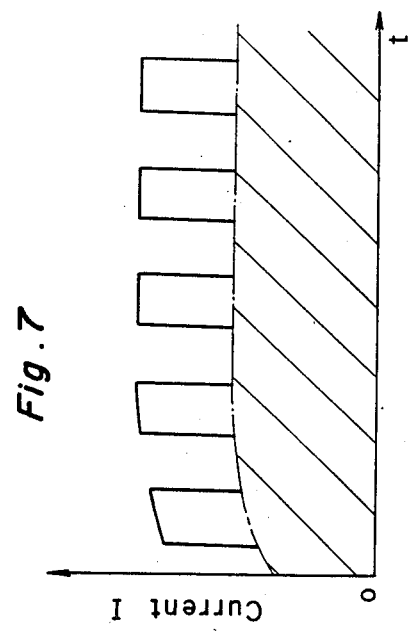
FIG. 7 is a graph showing one example of a current control for the semiconductor laser shown in FIG. 5.

A preferred embodiment according to the present invention will be described hereinafter, referring to the attached drawings.

FIG. 1 is a schematic diagram of a laser printer according to a preferred embodiment of the present invention.

In FIG. 1, an external data processing unit 50 outputs data for printing out to a file buffer memory 51, and the file buffer memory 51 stores the data temporarily and outputs the stored data to a data processing unit 52. The data processing unit 52 converts the input data into the image data referring to font data stored in a font ROM 61 and stores the converted image data in a RAM 62. Furthermore, the data processing unit 52 outputs the image data stored in the RAM 62 to a circuit 53 for driving a semiconductor laser 1 and for detecting the SOS signal (referred to hereinafter as "laser driving circuit") when the SOS signal is input from the laser driving circuit 53. The laser driving circuit 53 drives the semiconductor laser 1 according to the image data and detects the SOS signal representing the start of one scan line in accordance with a light beam outputted from the semiconductor laser 1 as described below in detail.

An optical scanning system of the laser printer is comprised of the semiconductor laser 1, a collimator lens 2, a cylindrical lens 3, a polygon mirror 4, an fθ lens 6 and a photoconductor drum 7. The semiconductor laser 1 is driven according to the image data so as to output a primary beam into the collimator lens 2. The collimator lens 2 converts the primary beam into a parallel light and the cylindrical lens 3 condenses the collimated beam at a point on one deflecting surface 5 of the polygon mirror 4 rotated by a motor (not shown). The polygon mirror 4 deflects the condensed beam to scan the deflected beam on an image recording area 70 of the photoconductor drum 7 through the fθ lens 6 in a direction B parallel to the axis of the photoconductor drum 7 according to the rotation thereof in the clockwise direction as indicated by an arrow A in FIG. 1. The fθ lens 6 is provided for correcting the scanning speed of the beam on the photoconductor drum 7 to keep it constant. The photoconductor drum 7 is rotated about the axis thereof by a motor (not shown) in a rotation direction C and the deflected beam is repeatedly scanned according to the rotation of the photoconductor drum 7 so as to form a latent image on the image recording area 70 of the photoconductor drum 7.

In the present preferred embodiment, the optical axis of the optical system including the semiconductor laser 1 and the lenses 2 and 3 is adjusted so that it coincides with a normal erected at the leading edge 5a of one deflecting surface 5 of the polygon mirror 4 at a moment before the laser 1 is driven for scanning the image recording area 70. In other words, there is a moment when the laser beam emitted from the semiconductor laser 1 becomes orthogonal to the deflecting surface 5 prior to the start of scan. Accordingly, at that moment, the incident laser beam is reflected by the deflecting surface 5 perpendicularly thereto so as to impinge into the semiconductor laser 1 through the cylindrical lens 3 and the collimator lens 2.

As shown in FIGS. 2a and 2b, the semiconductor laser 1 comprises a chip 21 of the laser diode for emitting a laser beam and a photodiode 22 for monitoring the light amount of the laser light beam arranged at the opposite side of an opening window 23. The primary beam outputted from the chip 21 of the laser diode is outputted through the opening window 23 and the secondary beam outputted from the chip 21 of the laser diode is incident on the photodiode 22 for monitoring the light amount of the laser beam. The primary beam passing through the opening window 23 is incident on the photoconductor drum 7 through the collimator lens 2, the cylindrical lens 3, the deflecting surface 5 and the fθ lens 6, as shown in FIG. 1. On the other hand, the secondary beam incident on the photodiode 22 is used for controlling the primary beam so as to keep a constant light amount of the laser beam outputted from the chip 21 of the laser diode. That is, the intensity of the light beam outputted from the chip 21 of the laser diode is indirectly detected by the photodiode 22 with use of the intensity of the secondary beam, and the current flowing in the chip 21 of the laser diode is controlled according to the light amount of the laser beam detected by the photodiode 22.

Figure 3:
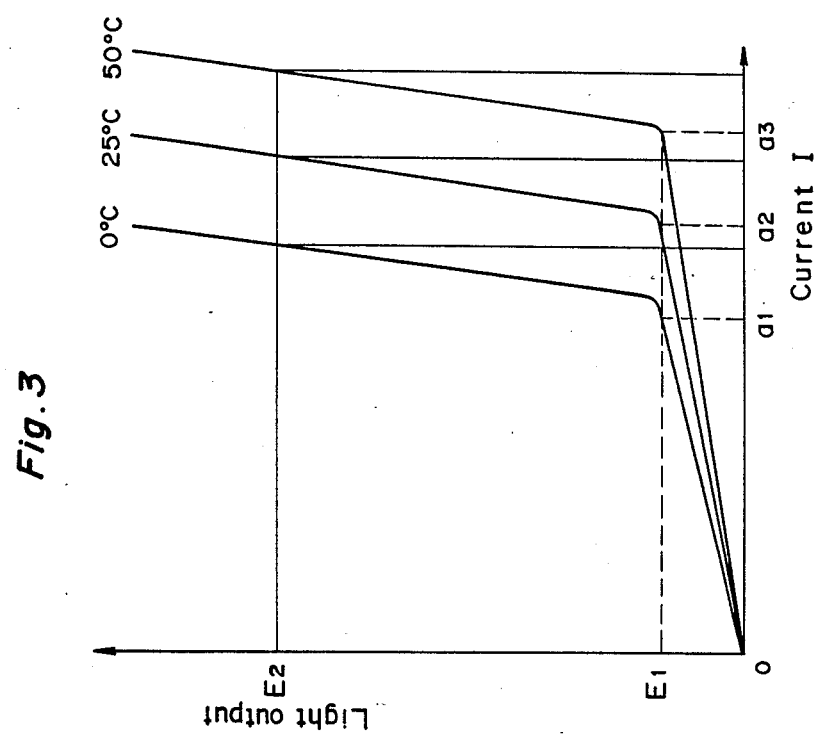
FIG. 3 is a graph showing an output characteristic of the semiconductor laser dependent on the current thereof.

As shown in FIG. 3, the relationship between the light output of the semiconductor laser 1 and the current flowing in the chip 21 of the laser diode is remarkably dependent on the temperature inside of the laser 1. In the preferred embodiment, the photodiode 22 is arranged within the semiconductor laser 1 and the light output of the chip 21 of the laser diode is reduced by self-heating so as to compensate the temperature, thereby providing a stabilized light output of the chip 21 of the laser diode.

If the photodiode 22 is used for detecting the SOS signal for every scan line, another exclusive photodiode for detecting the SOS signal is not required. Therefore, in the present preferred embodiment, as shown in FIGS. 1 and 4, when the primary beam is orthogonal to the deflecting surface 5 prior to the scanning of the primary beam on the image recording area 70 of the drum 7, the semiconductor laser 1 is driven by one pulse, the primary beam outputted from the laser 1 is incident on the deflecting surface 5, and the reflected primary beam by the deflecting surface 5 is incident again on the semiconductor laser 1. The primary beam incident again on the semiconductor laser 1 is superimposed on the secondary beam outputted at the same time from the chip 21 of the laser diode and is incident on the photodiode 22. The SOS signal representing the start of scan can be detected from the primary beam incident again on the semiconductor laser 1 by distinguishing the intensity of the primary beam superimposed on the secondary beam from the intensity of the secondary beam detected by the photodiode 22.

Figure 8A:
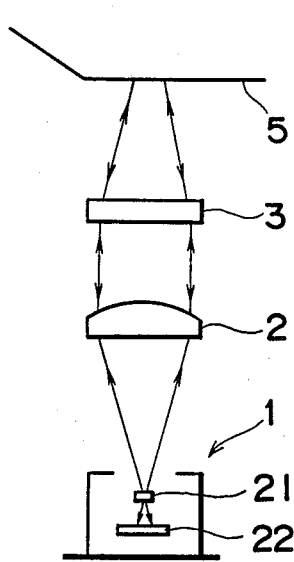
FIG. 8a is a schematic diagram showing a concrete structure of the optical system shown in FIG. 4 as seen from a direction of a rotational axis of the polygon mirror.
Figure 8B:
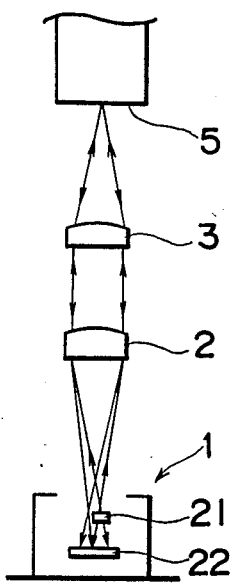
FIG. 8b is a schematic diagram showing the optical system shown in FIG. 8a as seen from a direction which is orthogonal to the rotational axis of the polygon mirror.

FIGS. 8a and 8b show a concrete structure of the optical system shown in FIG. 4, wherein FIG. 8a is a schematic diagram showing the optical system as seen from a direction of the rotational axis of the polygon mirror 5, and FIG. 8b is a schematic diagram showing the optical system as seen from a direction which is orthogonal to the rotational axis of the polygon mirror 5.

As shown in FIGS. 8a and 8b, the chip 21 of the laser diode is arranged so as to be slightly shifted toward the photodiode 22 in a direction of the rotational axis of the polygon mirror 4.

In the optical system constructed as described above, the semiconductor laser 1 is driven according to the image data so as to output a primary beam into the collimator lens 2, the collimator lens 2 converts the primary beam into a parallel light, and the cylindrical lens 3 condenses the collimated beam linearly in the direction of the rotational axis of polygon mirror 4, so that the collimated linear beam is incident onto one deflecting surface 5 of the polygon mirror 4. As described above, when the laser beam emitted from the semiconductor laser 1 becomes orthogonal to the deflecting surface 5, the incident laser beam is reflected by the deflecting surface 5 so as to be incident again onto the semiconductor laser 1 through the cylindrical lens 3 and the collimator lens 2. At that time, the returned laser beam is incident onto the photodiode 22 through the side of the chip 21 of the laser diode. On the other hand, the secondary beam emitted from the chip 21 of the laser diode is incident onto the photodiode 22 for monitoring the light amount of the laser beam.

The optical system constructed as described above can monitor not only the light amount of the light emitted from the chip 21 of the laser diode but also the variation of the laser optical system.

It is to be noted that the photodiode 22 has a large photodetecting surface sufficient to receive both of the primary beam and the secondary beam.

In the above description, the chip 21 of the laser diode is arranged so as to be slightly shifted toward the photodiode 22 in the direction of the rotational axis of the polygon mirror 4, however, the shifting direction of the chip 21 is not limited to this.

Figure 5:
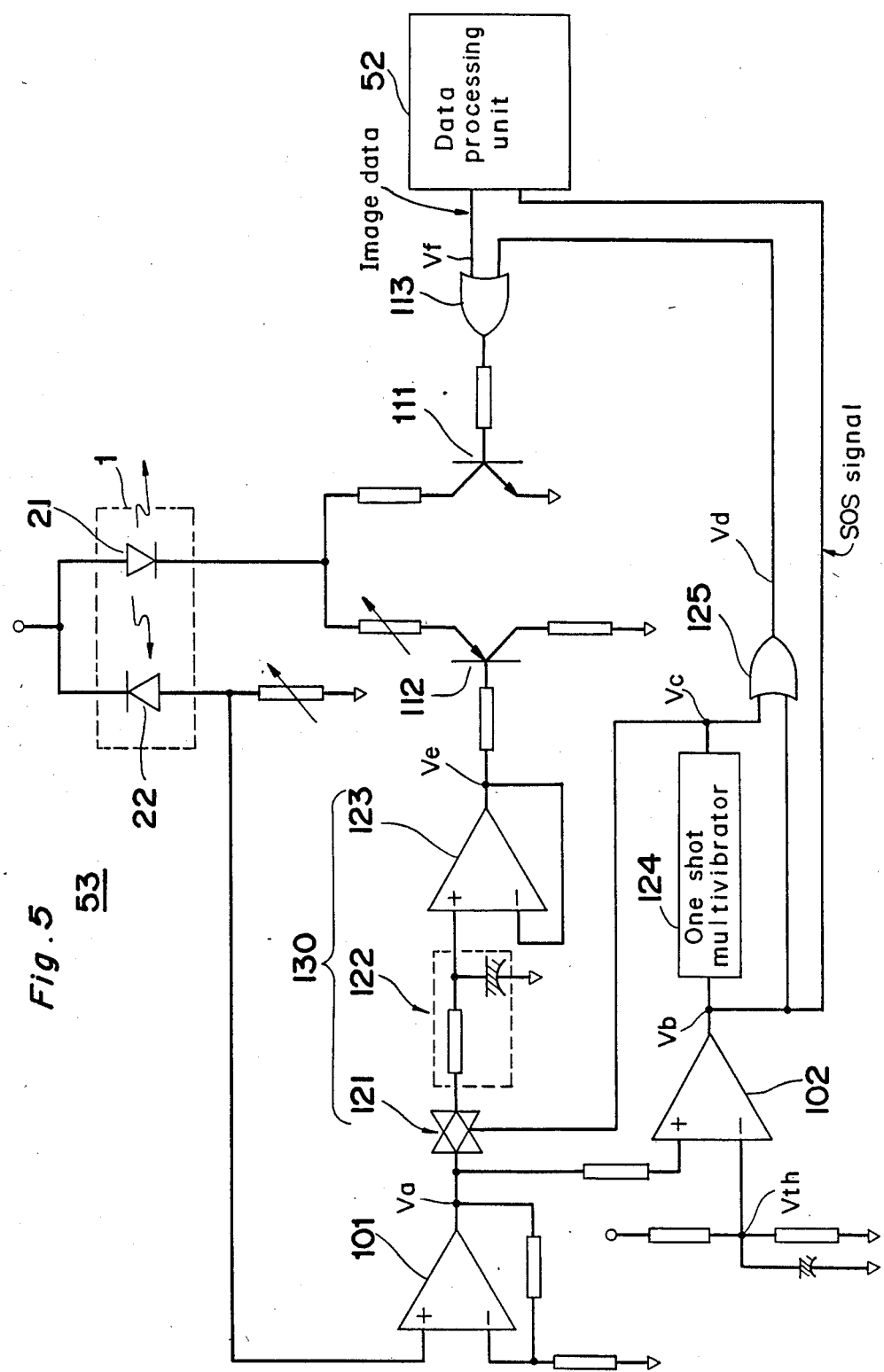
FIG. 5 is a schematic diagram of a laser driving circuit shown in FIG. 1.
Figure 6:
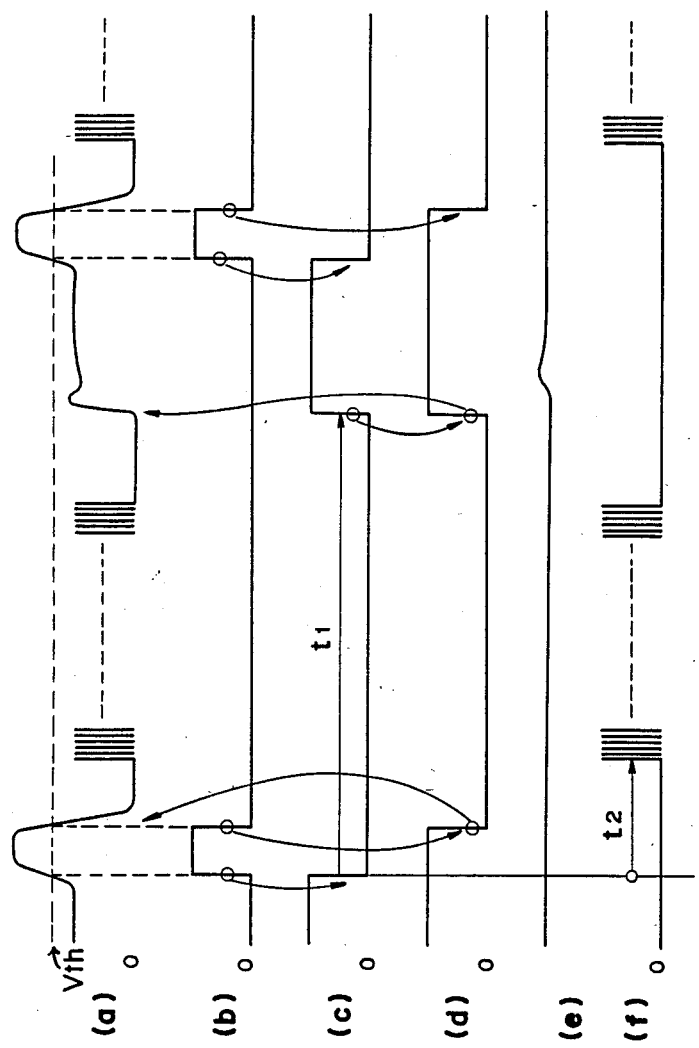
FIG. 6 is a timing chart showing an operation of the laser driving circuit shown in FIG. 5.

FIG. 5 shows the laser driving circuit 53 and FIG. 6 is a timing chart showing the operation of the laser driving circuit 53 shown in FIG. 5.

The SOS signal is detected as follows. The photodiode 22 is a photoelectric converter, wherein the current flowing in the photodiode 22 changes according to the intensity of the incident light beam. The current signal is converted to the voltage signal and the voltage signal is amplified by an operational amplifier 101 because the voltage signal is very low. Then, the amplified voltage Va is compared with a predetermined threshold voltage Vth by a comparator 102. The output voltage Vb of the comparator 102 becomes the SOS signal and the SOS signal is outputted into the data processing unit 52. The threshold voltage Vth of the comparator 102 is predetermined so as to be able to distinguish a voltage obtained when only the secondary beam is incident on the photodiode 22 from that obtained when the reflected primary beam is superimposed to the secondary beam on the photodiode 22. Therefore, as shown in FIG. 6 (b), when the primary beam is incident again on the semiconductor laser 1, the output voltage Vb of the comparator 102 becomes high level, and the output voltage Vb of the comparator 102 can be used as the SOS signal representing the start of scan.

The output control of the laser is performed as follows. The current flowing in the chip 21 of the laser diode is controlled by the transistors 111 and 112. As shown in FIG. 6 (f), the image data f for forming the latent image outputted from the data processing unit 52 is input into an input terminal of an OR gate 113 and a constant current flows between the collector and the emitter of the transistor 111 when the image data becomes high level. On the other hand, another transistor 112 is set so that a constant current always flows between the collector and the emitter of the transistor 112, because the response characteristic of the light output degrades for the transient characteristic of the chip 21 of the laser diode when the voltage input into the chip 21 of the laser diode is switched from 0 V. Therefore, it is necessary to supply a constant current to the transistor 112. When only the transistor 112 supplies a constant current to the chip 21 of the laser diode, the light output value of the chip 21 of the laser diode is set so as to be a low level insufficient to form the latent image on the photoconductor drum 7. Concretely, the light output value of the chip 21 of the laser diode is set so as to be a level below the level $E_1$ shown in FIG. 3, which is the level before the light output increases steeply. When the current flows in both of the transistors 111 and 112, the light output having a level $E_2$ shown in FIG. 3 sufficient to expose the photoconductor drum 7 to the laser light is generated.

The control for keeping a constant light output of the laser is performed by changing the current (which is an oblique line portion in FIG. 7) flowing in the transistor 112 according to the light amount of the secondary beam incident on the photodiode 22, under the condition that the chip 21 of the laser diode emits a laser beam having a level sufficient to form the latent image on the photoconductor drum 7, as shown in one example of FIG. 7. On the other hand, the current flowing in another transistor 111 is not controlled. That is, the voltage signal detected by the photodiode 22 under the condition that the current flows through both of the transistors 111 and 112 is amplified by the operational amplifier 101, and the amplified voltage signal is input into the base of the transistor 112 through a sample and hold circuit 130. Therefore, in the transistor 112, the collector current is controlled so that the output voltage a of the operational amplifier 101 becomes constant, i.e. the intensity of the light beam outputted from the chip 21 of the laser diode becomes constant.

The sample and hold circuit 130 comprises an analog switch 121, a CR circuit 122 and an operational amplifier 123. The sample and hold circuit 130 is arranged between the amplifier 101 and the transistor 112, because the light output is controlled only when the primary beam may be scanned on the non image recording areas 71 and 72 of the photoconductor drum 7. On the other hand, when the primary beam is scanned on the image recording area 70 of the drum 7, the latent image is formed on the image recording area 70 of the photoconductor drum 7 by generating the primary beam or stopping the generation of the primary beam according to the image data. However, it is very difficult to control so as to keep a constant light output of the laser 1 when the image is formed on the photoconductor drum 7, because the light output is unstable immediately after the semiconductor laser 1 is energized and there is a delay time of the control circuit for keeping a constant light output. Therefore, as described hereinafter, when the image is not formed on the photoconductor drum 7, i.e. when the primary beam may be scanned on the non image recording area 71, the analog switch 121 is closed and the sampling operation of the output voltage Va is performed, then, the analog switch 121 is opened prior to the scanning of the primary beam on the image recording area 70 of the drum 7 (i.e. when the laser 1 is driven by one pulse and the primary beam is incident again on the laser 1), and the constant light output is held. When the primary beam is scanned on the image recording area 70, the latent image is formed on the photoconductor drum 7 with use of the constant light output outputted from the chip 21 of the laser diode.

The CR circuit 122 in the sample and hold circuit 130 is used for delaying the response of the feed back system. In the present preferred embodiment, the light output is held when the primary beam is incident again on the semiconductor laser 1. If the CR circuit 122 is not arranged, a current value of the transistor 112 is held when the feed back operation is performed in the decreasing direction of the current of the transistor 112, because the constant light output is held when the light output having a higher level than a predetermined level is incident on the photodiode 22. Therefore, the CR time constant of the CR circuit 122 is predetermined so as not to hold the output of the photodiode 22 when the primary beam is incident again on the photodiode 22, resulting in that the response of the feed back system is delayed. Thus, as shown in FIG. 6 (e), the output Ve of the operational amplifier 123 is stabilized and the SOS signal detecting circuit does not affect the laser light output control circuit.

Next, the timing for controlling the light output will be described hereinafter. A one shot multivibrator 124 and an OR gate 125 are used for controlling the light output. The SOS signal Vb outputted from the comparator 102 is outputted into the one shot multivibrator 124 and an input terminal of the OR gate 125. The output signal Vc of the one shot multivibrator 124 is outputted into the control gate terminal of the analog switch 121 and another input terminal of the OR gate 125. As shown in FIG. 6 (c), the output signal Vc of the one shot multivibrator 124 becomes "0" at the leading edge of the SOS signal Vb, i.e. when the primary beam is incident again on the photodiode 22. After the image recording period passes, i.e., after a predetermined time interval t1 from the leading edge of the SOS signal Vb, the output signal Vc of the one shot multivibrator 124 becomes high level in order to enable the semiconductor laser 1. Therefore, the analog switch 121 is opened for the image recording period and the feed back control for keeping a constant light output is not performed.

On the other hand, the SOS signal Vb and the output signal Vc of the one shot multivibrator 124 are input into the inputs of the OR gate 125, respectively and the output signal Vd of the OR gate 125 is input into the base of the transistor 111 through the OR gate 113. Therefore, the chip 21 of the laser diode is enabled when the analog switch 121 is closed and the sampling of the laser light output is performed, on the other hand, when the primary beam is incident again on the semiconductor laser 1, the emitting condition of the laser is maintained so as to detect the SOS signal.

It is further understood by those skilled in the art that the foregoing description is preferred embodiment of the disclosed circuit and that various changes and modifications may be made in the invention without departing from the spirit and scope thereof.

What is claimed is:

1. An image recording apparatus comprising:
   a laser light source for generating a primary beam for scanning and a secondary beam for monitoring the light amount thereof which has a light detecting means therein, said light detecting means detecting said light amount of the secondary beam usually;
   a photoconductor means for forming a latent image thereon;
   a deflecting means having at least one deflecting surface for deflecting said primary beam from said laser light source to scan it on said photoconductor means, said deflecting means and said laser light source being arranged in such a manner that said primary beam is reflected by said deflecting means toward said laser light source at a moment before starting the scan; and
   a distinguishing means for distinguishing the output signal of said light detecting means obtained when only the secondary beam is incident on said light detecting means from the output signal of said light detecting means obtained when the secondary beam and the primary beam having been reflected from said deflecting means are incident at the same time on said light detecting means in order to output a start of scan signal for each scan line at a moment when the primary beam and the secondary beam are incident at the same time on said light detecting means.

2. The image recording apparatus as defined in claim 1, wherein said distinguishing means comprises a comparator for comparing the output signal of said light detecting means with a predetermined threshold level so as to output the start of scan signal when the output signal of said light detecting means has a greater level than the predetermined threshold level.

3. The image recording apparatus as defined in claim 1, wherein said laser light source and said light detecting means are arranged so as to be slightly shifted from a normal line of the deflecting surface of said deflecting means, at the timing when said deflecting means faces the deflecting surface thereof toward said laser light source and the said light detecting means.

4. An image recording apparatus comprising:
   a laser light source for generating a primary beam for scanning and a secondary beam for monitoring the light amount thereof which has a light detecting means therein, said light detecting means detecting said light amount of the secondary beam usually;
   a photoconductor means for forming a latent image thereon;

a deflecting means having at least one deflecting surface for deflecting said primary beam from said laser light source to scan it on said photoconductor means, said deflecting means and said laser light source being arranged in such a manner that said primary beam is reflected by said deflecting means toward said laser light source at a moment before starting the scan;

a distinguishing means for distinguishing the output signal of said light detecting means obtained when only the secondary beam is incident on said light detecting means from the output signal of said light detecting means obtained when the secondary beam and the primary beam having been reflected from said deflecting means are incident at the same time on said light detecting means in order to output a start of scan signal for every one scan line at a moment when the primary beam and the secondary beam are incident at the same time on said light detecting means;

a sample and hold means for sampling and holding the output signal outputted from said light detecting means;

a current supply means for supplying a driving current to said laser light source so as to keep a constant light output according to the output signal outputted from said sample holding means; and a control means for making said current supply means supply the driving current at least for a first period required for detecting the start of scan signal and making said sample and hold means hold the sampling value of the first period at least for the first period and a second period when the image is formed on said photoconductor means.

5. The image recording apparatus as defined in claim 4, wherein said distinguishing means comprises a comparator for comparing the output signal of said light detecting means with a predetermined threshold level so as to output the start of scan signal when the output signal of said light detecting means has a greater level than the predetermined threshold level.

6. The image recording apparatus as defined in claim 4, wherein said laser light source and said light detecting means are arranged so as to be slightly shifted from a normal line of the deflecting surface of said deflecting means, at the timing when said deflecting means faces the deflecting surface thereof toward said laser light source and the said light detecting means.

7. In an image recording apparatus having a laser light source for generating controlled indicia on a surface and means for directing the laser light emitted from the laser source to scan the surface, the improvement comprising:

a housing for positioning the laser light source in an operative relationship to the directing means;

means for continually monitoring the light output of the laser light source; and means for supplementing the light output of the directed laser light source with a return of at least a portion of the laser light during each scan to the monitoring means, whereby a start of scan signal can be determined.

8. The image recording apparatus as defined in claim 7, wherein the housing mounts a laser light source and the means for continually monitoring the laser light source is a photodetector mounted in the housing.

9. The image recording apparatus as defined in claim 8, wherein the housing includes an exit window and the photodetector is mounted relatively further away from the exit window than the laser source.

10. The image recording apparatus as defined in claim 8, wherein the means for supplementing the light output is an optical system for directing the laser light back into the housing member through the exit window.

11. The image recording apparatus as defined in claim 8, further including first circuit means connected to the photodetector for maintaining a constant light output of the laser light source.

12. The image recording apparatus as defined in claim 9, wherein said light source and said photodetector are arranged so as to be slightly shifted so that the light returned from said directing means can be detected by said photodetector.

13. The image recording apparatus as defined in claim 11, further including second circuit means connected to the photodetector for creating a start of scan signal.

* * * * *

Disclaimer

4,888,647—*Kanji Wada*, Osaka, Japan. IMAGE RECORDING APPARATUS WITH IMPROVED SOS DETECTION. Patent dated Dec. 19, 1989. Disclaimer filed April 13, 1990, by the assignee, Minolta Camera Kabushiki Kaisha.

Hereby enters this disclaimer to claims 7 through 13 of said patent.
*[Official Gazette February 18, 1992]*